United States Patent [19]

Worley

[11] 4,347,865

[45] Sep. 7, 1982

[54] FABRICATED GATE VALVES

[75] Inventor: Arthur C. Worley, Morristown, N.J.

[73] Assignee: Exxon Research & Engineering Co., Florham Park, N.J.

[21] Appl. No.: 160,557

[22] Filed: Jun. 17, 1980

Related U.S. Application Data

[63] Continuation of Ser. No. 895,918, Apr. 13, 1978, abandoned.

[51] Int. Cl.³ ............................................. F16L 7/00
[52] U.S. Cl. .................................. 137/375; 251/86; 251/168; 251/197; 251/363; 251/367
[58] Field of Search ................. 137/375; 251/86, 167, 251/168, 197, 199, 328, 329, 363, 367

[56] References Cited

U.S. PATENT DOCUMENTS

| | | | |
|---|---|---|---|
| 1,270,049 | 6/1918 | Murray | 251/328 |
| 1,800,251 | 4/1931 | Fox | 137/375 |
| 2,084,207 | 6/1937 | Lindquist | 251/367 X |
| 2,261,269 | 11/1941 | Mohr | 251/367 |
| 2,520,364 | 8/1950 | Hobbs | 251/167 |
| 2,622,840 | 12/1952 | Cooke | 251/199 X |
| 2,683,581 | 7/1954 | Rovang | 251/328 X |
| 2,689,106 | 9/1954 | Watkins | 251/367 X |
| 2,834,097 | 5/1958 | Eichenberg | 251/329 X |
| 2,869,574 | 1/1959 | Volpin | 251/329 X |
| 2,902,252 | 9/1959 | Ballard | 251/168 |
| 3,032,310 | 5/1962 | Hansen | 251/329 X |
| 3,078,871 | 2/1963 | Magos | 251/329 X |
| 3,164,363 | 1/1965 | Williams | 251/329 X |
| 3,224,729 | 12/1965 | Beurel | 251/197 X |
| 3,458,172 | 7/1969 | Burrows | 251/368 X |
| 3,695,578 | 10/1972 | Walther | 251/197 X |
| 3,726,306 | 4/1973 | Purvis | 137/375 |

Primary Examiner—Harold W. Weakley
Attorney, Agent, or Firm—F. Donald Paris; Donald F. Wohlers

[57] ABSTRACT

A gate valve has a hollow substantially T-shaped housing having opposed tubular ends through which a pair of coaxial sleeves extend, the sleeves terminating in the interior of the housing in a pair of seats. A gate includes a pair of gate members which are movable in the space between the seats to and from closed positions engaging the seats. The gate members are moved by a structure which first displaces the gates transversely to the common axis of the sleeves until the gates are in a position of alignment with the sleeves, and then while the structure which moves the gates continues to operate, a stop engages the gate members to guide them for movement into engagement with the seats. When engaging the stop the gate members move along the common axis of the sleeves. The sleeves serve to protect the housing from the effects of temperature fluctuations of the fluid flowing through the sleeves. In addition the sleeves can readily be removed and replaced as required. Preferably at least the sleeves and in addition the other components of the valve are made of forged or rolled steel so that the valve does not have any cast steel components which are likely to crack as a result of casting deficiencies or flaws.

3 Claims, 7 Drawing Figures

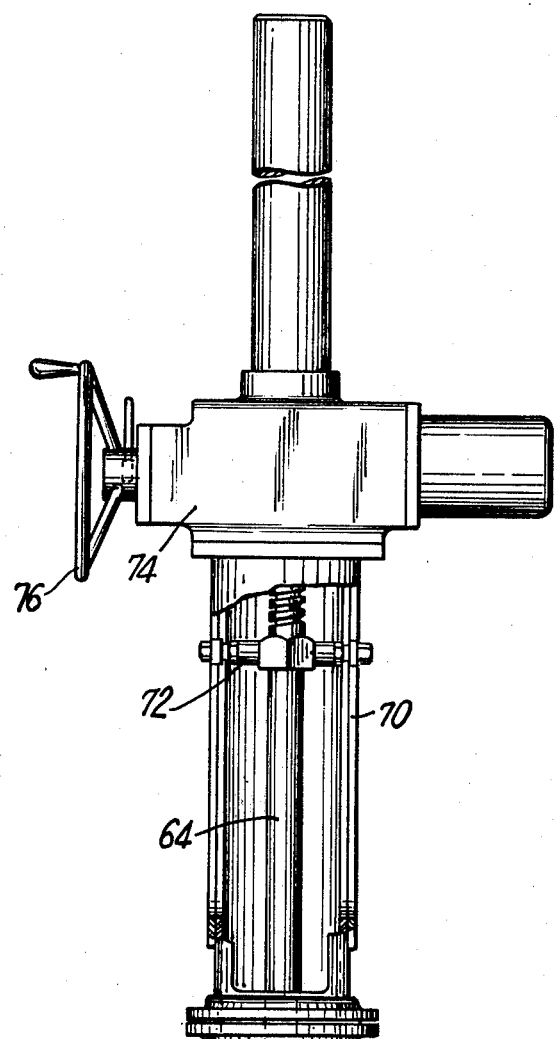
FIG.2
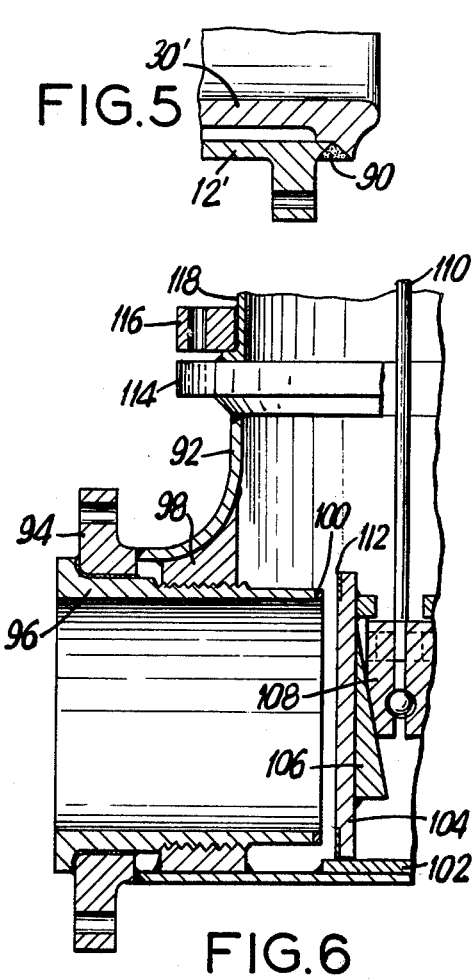
FIG.5
FIG.6
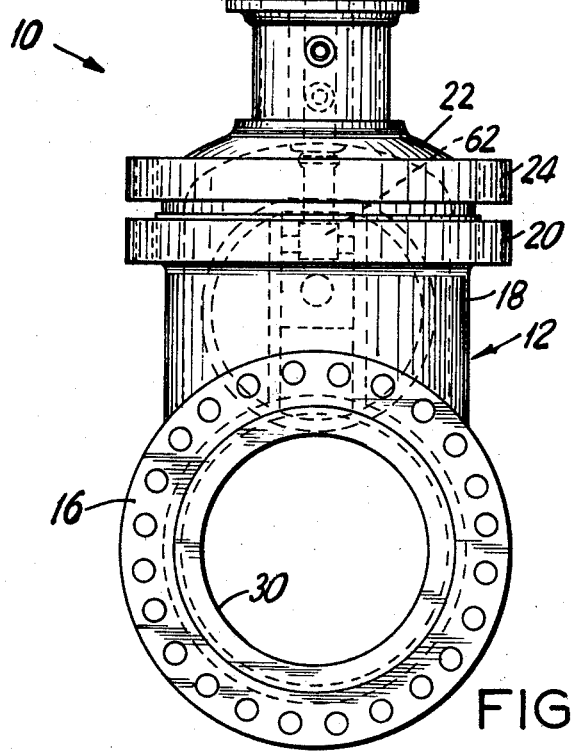
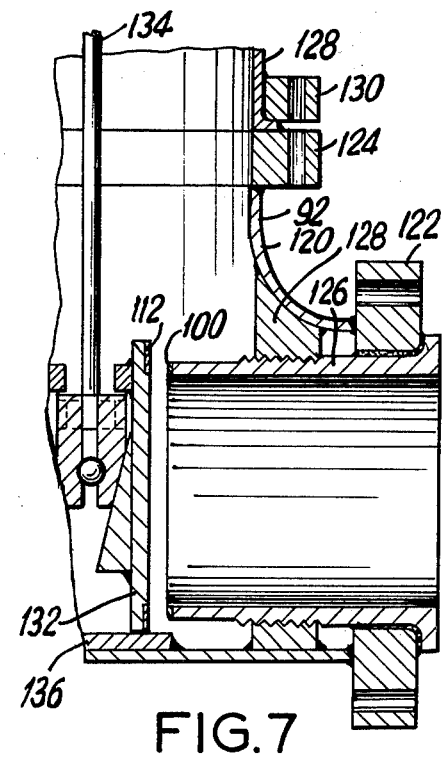
FIG.7

FABRICATED GATE VALVES

This is a continuation of application Ser. No. 895,918, filed April. 13, 1978 now abandoned.

BACKGROUND OF THE INVENTION

The present invention relates to valves and more particularly, to improved gate valves.

The present invention is particularly suitable for gate valves which are of a relatively large size ranging, for example, from 8 inches through 36 inches. The valve of the invention is suitable as a gate valve for cyclic temperature service such as for use in cyclic powerformers, although the gate valve of the invention is suitable for most process plant services. While the valve of the invention can be used for all sizes and pressure ratings, it is particularly designed for sizes on the order of the above range and for pressure ratings of 150 pounds through 600 pounds.

Conventional valves of the above general type are made of castings which have proved from experience to be unsuited for relatively great and frequent temperature fluctuations.

Thus, with conventional valves of this type the castings have been known to crack in some cases in as short a time as within one year after a valve is put into service. Such cracking creates considerable problems either in connection with repair of the cracks or in connection with replacement of cracked components.

SUMMARY OF THE INVENTION

It is accordingly a primary object of the present invention to provide a valve which will avoid the above drawbacks.

In particular, it is an object of the present invention to provide a valve which can operate reliably through relatively large temperature fluctuations.

In addition, it is an object of the present invention to provide a valve in which components which are subject to wear can readily be replaced as required.

Furthermore, it is an object of the present invention to provide a construction which can readily be made up of standard components made of rolled or forged metal and which can reliably be welded together in an effective manner which will provide a valve capable of giving uninterrupted service over a long period.

In addition, the welding can be performed as simple butt welds by automatic welding equipment since the welds are axis-symmetric and located in a plane perpendicular to the valve axis. In conventional welded valves the welds cannot be made on automatic welders since they involve complex intersections which are difficult to check.

Yet another object of the present invention is to provide a valve of the above general type which will operate properly even if certain parts such as the valve seats are not precisely oriented in the finished valve.

In addition it is an object of the present invention to provide a valve structure which cannot only be used for completely new valves to achieve the above objects but which also lends itself to use with existing valves to increase the operating life thereof.

According to the invention the gate valve includes a housing means carrying a tubular means through which a fluid is adapted to flow, along the central axis of the tubular means, this tubular means terminating in the hollow interior of the housing means in a seat means. A gate means is adapted to cooperate with the seat means for placing the valve in its closed position while the gate means can be displaced away from the seat means to an open position. A moving means is operatively connected with the gate means to displace the latter between its closed and open positions. This moving means first moving the gate means transversely to the axis of the tubular means until the gate means has a position of alignment with the tubular means. Then while the moving means continues to operate a stop means cooperates with the gate means to displace the latter into engagement with the seat means to provide the closed position of the valve.

BRIEF DESCRIPTION OF THE DRAWINGS

The invention is illustrated by way of example in the accompanying drawings which form part of this application and in which:

FIG. 2 is a schematic elevation of the valve of FIG. 1 as seen from the right of FIG. 1;

FIG. 5 is a fragmentary sectional elevation of a different embodiment of a structure for connecting a sleeve to a housing of the valve by means of a weld;

FIG. 6 shows one side of a valve of the invention according to a further embodiment thereof; and FIG. 7 shows also one side of a valve of the invention according to yet another embodiment.

DESCRIPTION OF THE PREFERRED EMBODIMENTS

Figure 1:
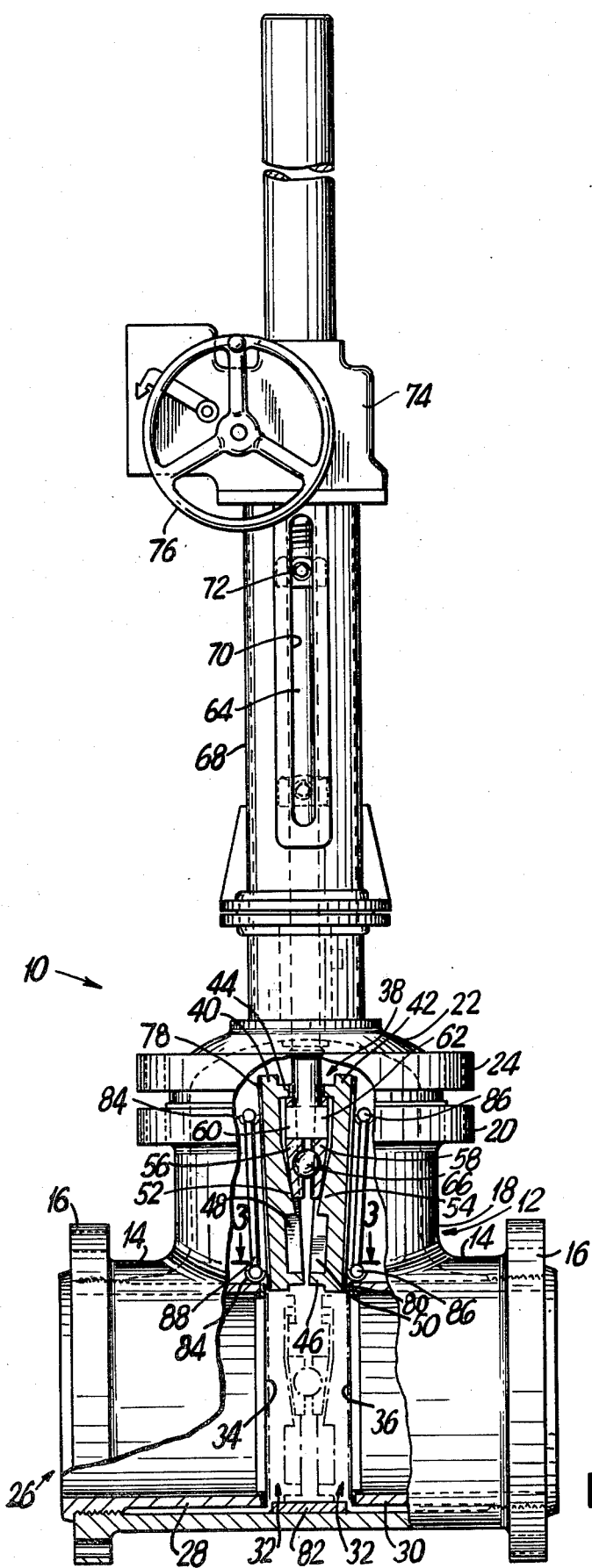
FIG. 1 is a partly schematic elevation of a valve according to the invention, the valve being shown with the housing partly broken away and with valve structure situated therein shown in section.

Referring to FIGS. 1 and 2 the illustrated gate valve 10 of the present invention includes a housing means 12 which is of a hollow T-shaped configuration. This housing means 12 is made up of components which are wrought, in that the metal thereof can be rolled or forged, so that the housing means 12 is not made of a cast metal. This housing means 12 has a pair of opposed coaxial tubular ends 14 terminating in circular flanges 16 which serve to connect the valves into a suitable pipe so as to control the flow of fluid therethrough. Although the flanges 16 are shown as being integral with the remainder of the housing means 12, these flanges 16 can be separate components which are welded to the remainder of the housing means 12. The central upright tubular portion 18 of the housing means 12 terminates also in a flange 20 which can be welded to the remainder of the housing means and which serves to connect to the central part 18 an upper bonnet 22 terminating in a lower flange 24 which can be bolted to the flange 20 for completing the valve housing.

According to a particular feature of the present invention, the housing means 12 carries at its tubular ends 14 a tubular means 26 which in the illustrated example is made up of a pair of coaxial sleeves 28 and 30 which are identical and which have a common axis along which the fluid is adapted to flow. It will be seen that in the illustrated example the tubular ends 14 are internally threaded while the sleeves 28 and 30 are externally threaded and are simply threaded into the tubular means 14 so as to extend therethrough in the manner most clearly apparent from FIG. 1.

Figure 4:
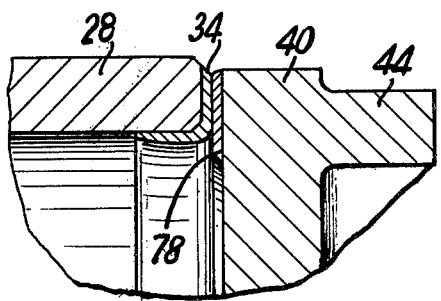
FIG. 4 is an enlarged fragmentary sectional illustration of the cooperation between a gate member and a valve seat.

The sleeves 28 and 30 of the tubular means 26 terminate in a seat means 32 situated in the hollow interior of the housing means 12. This seat means 32 is in the form of a pair of seats 34 and 36 respectively situated at the inner coaxial ends of the sleeves 28 and 30. Preferably the seats 34 and 36 are in the form of metallic coatings situated at the inner ends of the sleeves 28 and 30, respectively. Thus FIG. 4 shows most clearly at the inner end of the sleeve 28 a coating 34 made, for example, of a metallic deposit such as Stellite No. 6.

Figure 3:
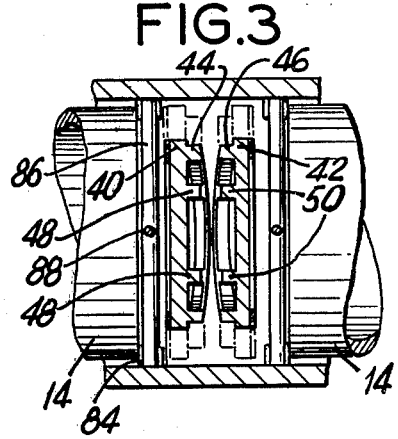
FIG. 3 is a fragmentary section of the valve structure taken along line 3—3 of FIG. 1 in the direction of the arrows.

A gate means 38 cooperates with the seat means 32. This gate means 38 includes a pair of gate members 40 and 42 in the form of circular discs. The discs 40 and 42 are provided at their inner surfaces which are directed toward each other with circular flanges 44 and 46, respectively. In addition, the gate discs 40 and 42 have at their inner side surfaces which face each other vertically extending guide ribs 48 and 50. Thus, as is shown most clearly in FIG. 3, the gate disc 40 has a pair of parallel vertical guide ribs 48 while the gate disc 42 has a pair of parallel vertical guide ribs 50.

Between these guide ribs the gate discs have wedge members which forms part of a moving means for controlling the displacement of the gate members. Thus the gate member 40 carries between the guides 48 a wedge member 52 which may be integral with or welded to the gate member, while the gate member 42 carries a corresponding wedge member 54.

The moving means which is operatively connected to the gate means 38 for controlling the movement thereof includes, in addition to the wedge members 52 and 54, a pair of separate wedge members 56 and 58. These wedge members 56 and 58 are respectively situated with respect to the wedge members 52 and 54 in the manner apparent from FIG. 1. The wedge members 56 and 58 are formed at the region of their upper ends with rectangular or square openings which receives a pair of mating rectangular or square projections 60 and 62 which are fixed to or integrally formed with an elongated rod 64 which forms part of the moving means for controlling the movement of the gate means 38. This rod 64 terminates at its bottom end above a ball member 66 (rod 64 is not directly connected to ball 66, i.e., the ball is loose but caged within wedges 56 and 58), while the wedge members 56 and 58 are formed with concave recesses which receive the ball member 66 in the manner shown in FIG. 1. Thus the wedge members 56 and 58 are simply connected with the rod 64 of the moving means by receiving the projections 60 and 62 thereof while at the same time there is sufficient clearance of the projections 60 and 62 in the corresponding openings of the wedge members 56 and 58 to provide for the latter the possibility of tilting with respect to the ball member 66.

The bonnet 22 is connected, in the manner illustrated, to an upwardly directed tubular hollow structure 68 formed with a pair of opposed parallel and aligned guide slots 70. The rod 64 is fixed to a transverse unit 72, free ends of which are received in the slots 70 so that the rod 64 cannot turn while at the same time it is capable of moving vertically. The upper portion of the rod 64 is threaded and extends through an internally threaded worm wheel mounted for rotary movement in the upper housing portion 74. The unillustrated worm wheel cooperates with a worm which is rotated by a hand wheel 76. Thus when the hand wheel 76 is rotated in one direction or the other, the rod 64 will be raised or lowered. The rod 64 is guided in a fluid-tight manner through a suitable stuffing box 78 situated just above the bonnet 22, as illustrated. In this way the interior of the housing means 12 is fluid-tightly closed off from the part of the structure which extends above the bonnet 22.

When the discs 40 and 42 of the gate means 38 are in a position of alignment with the sleeves 28 and 30 of the tubular means 26, these discs are adapted to be displaced in a manner described below to their closed positions engaging the seat means 32. For this purpose the pair of discs 40 and 42 have integrally connected therewith at their outer surfaces which are directed toward the seats 34 and 36 the circular coatings 78 and 80. FIG. 4 illustrates the coating 78 of the gate disc 40. These coatings 78 and 80 may also be made of a metallic deposit, preferably Stellite No. 6, and in the closed position of the gate means 38 the coatings 78 and 80 thereof are respectively pressed against the coatings 34 and 36 which form the seats of the seat means 32.

The gate members 40 and 42 are illustrated in solid lines in FIG. 1 in their open positions where they are raised away from the path of flow provided by the sleeves 28 and 30. In this position the gate members rest at the upper portions of their flanges 44 and 46 on the upper ends of the wedge members 56 and 58. In order to close the valve, the hand wheel 76 is operated so as to lower the rod 64 and thus the pair of gate members 40 and 42 will be lowered, transversely to the common axis of the sleeve 28 and 30, into the space between the sleeves. The gate members can be lowered until they engage a pedestal or stop means 82 carried by the housing means 12 in the hollow interior thereof in the path of lowering movement of the gate members. Thus the stop means 82 is in the form of a simple plate which is welded to the housing means in the interior thereof in alignment with the space between the sleeves 28 and 30, as shown most clearly in FIG. 1. The elevation of the upper surface of the stop means 82 is such that when the pair of gate members 40 and 42 "bottom" on the stop means 82, the gate members are in a position of alignment with the sleeves 28 and 30. Upon initially engaging the stop means 82, however, the gate members still are not pressed against the valve seats. However, from the moment when the gate members engage the stop means 82, the continued downward movement of the rod 64 will cause the wedge members 56 and 58 to be displaced downwardly with respect to the wedge members 52 and 54, respectively, so that this continued operation of the moving means will cause the pair of gate members to spread apart from each other toward the seats 34 and 36 so as to be pressed tightly against these seats in response to the wedging engagement, and thus the valve will be placed in its closed position. It is to be noted that because of the fact that the wedge members 56 and 58 can turn to some extent with respect to the ball member 66, it is possible for the gate members to tilt with respect to each other so as to properly and fluid-tightly engage the valve seats 34 and 36 along their entire length even if these valve seats are not precisely in planes which are exactly normal to the common axis of the sleeves 28 and 30.

The valve is opened by the reverse of the above operation. Thus the hand wheel 76 is turned so as to raise the rod 64, and the wedge members 56 and 58 then move up slightly through the distance required to place the upper ends of the wedge members 56 and 58 in engagement with the upper portions of the inner flanges 44 and 46, and then the continued upward movement of the rod 64 will raise the gate means 38 to its open position illustrated in FIG. 1.

In order to prevent any possible displacement of the gate members from the wedge members 56 and 58 on which the gate members rest during vertical displacement of the gate members, the upper tubular portion 18 of the housing means 12 carries in its interior a plurality of channel members 84 on which horizontal rods 86 rest. It will be seen from FIG. 1 that there are a pair of these rods 86, to the left of the gate disc 40, resting on channel members 84 carried by the tubular part 18 of the housing means 12, and in the same way a pair of additional rods 86 are situated to the right of the gate disc 42 of FIG. 1. The rods 86 are fixed to the upper and lower ends of vertically extending rods 88 in the manner most clearly apparent from FIGS. 1 and 3. Thus, these vertically extending rods 88 assure that due to vibrations or the like the gate members will not be displaced from the wedge members 56 and 58.

However, if necessary the bonnet 22 can be disconnected from the housing portion 18 and raised upwardly with respect thereto, whereupon these rod assemblies 86, 88 can be removed, and then the discs can be removed and replaced as required, as, for example, when discs with new coatings 78 or 80 are required.

In addition, it will be seen that due to the threaded connection of the sleeves 28 and 30 with the housing means 12, these sleeves 28 and 30 can be removed when required, as when sleeves with new seats 34 and 36 are required.

The aforedescribed action between the discs and the seat allows the disc to contact the seat without any substantially shear type action. This particular feature greatly increases valve life since on conventional valves the action between the discs and seat is a sliding action. When the valve is closed and opened, this results in scoring or wear on the seating surfaces. With the present valve, there is no such action and the disc contacts the seat without sideways or lateral motion relative to the direction of disc movement thereby increasing service life of the valve.

In addition, instead of using the threaded connection between the sleeves and housing as shown in FIG. 1, it is possible to use the connection illustrated in FIG. 5. This embodiment is used when the valve is welded into the line instead of being bolted into the line through the use of flanged joints. Thus FIG. 5 fragmentarily illustrates the lower right portion of a housing means 12' which corresponds to the housing 12. In this embodiment each sleeve, such as the sleeve 30' shown in FIG. 5, has only a welded connection with the housing means. Thus the sleeve 30' is shown as being connected with the housing means 12' by way of the annular weld 90 which may be a full butt weld. Thus, with this construction also each sleeve will be reliably connected with the housing means while at the same time being removable therefrom upon removal of the weld 90. This end configuration permits the valve to be welded into the line (by simple butt welds) rather than flanged by means of a bolted joint.

It will be noted that with both of these constructions the sleeves which form the tubular means 26 protect the housing means 12 from the influence of the fluid which flows through the sleeves. In other words, the housing means 12 is protected from exposure to the cyclical temperature fluctuations of the fluid by way of the sleeves which serve to reduce the extent to which the housing means 12 is thermally influenced by the fluid.

Further possible embodiments of the invention are respectively illustrated in FIGS. 6 and 7.

Thus, referring to FIG. 6 it will be seen that the illustrated gate valve structure includes the housing means 92 which is also of a hollow T-shaped configuration and which is made from a wrought metal in the same way as the other embodiments. In this case the housing means 92 carries at each of its opposed coaxial ends a lap-joint flange 94 which is fixed at its inner peripheral region by way of a removable seal weld to a sleeve 96 which forms one of a pair of coaxial sleeves in the same way as in the other embodiments. In the embodiment of FIG. 6, howwever, the housing means 92 fixedly carries in its interior a metal ring 98 which is internally threaded, this ring being, for example, welded to the inner surface of the housing means 92 at the region of each of its opposed coaxial ends, as illustrated for the particular portion of the housing means 92 which is illustrated in FIG. 6. The sleeve 96 is externally threaded and has a threaded connection with the ring 98. The ring 96 of course terminates at its inner end in a valve seat 100 which may be in the form of a Stellite 6 coating deposit as was the case with the other embodiments.

The housing means 92 also carries a pedestal or stop means 102 which corresponds to the stop means 82 and which serves for engaging the lower end of the gate disc 104 of this particular embodiment. This gate disc may be identical with that described above and carries, as illustrated, a wedge member 106 which cooperates with a wedge member 108 carried in the manner described above by a vertically movable rod 110 which can be actuated in the same way as the rod 64. Of course, the disc 104 has a circular coating deposit 112 made of Stellite 6, for example, and coacting with the seat 100 in the manner described above.

At its upper end the housing 92 has a flange 114 of angular cross section welded thereto, and this flange is connected by suitable bolts to a second flange 116 connected by a seal weld to the bonnet 118 which is fragmentarily illustrated.

Thus it is possible to provide the embodiment of FIG. 6 by way of welding or threading together standardized components which are relatively inexpensive while at the same time being quite strong. The great advantage which is achieved with the embodiment of FIG. 6 is that the thrust of the gate disc 104 against the seat 100 is taken up by the threaded connection between the sleeve 96 and the ring 98, so that in this way this force need not be fully absorbed by the weld between the sleeve 96 and the flange 94. In this way the connection between flange 94 and the sleeve 96 is protected while at the same time the sleeve 96 can easily be removed upon removing the seal weld connection between the sleeve 96 and the flange 94.

The embodiment of FIG. 7 is substantially similar to that of FIG. 6. Thus embodiment also includes a hollow housing means 120 which may be of the same construction as the housing means 92. However in the case of the housing means 120, this housing means includes a ring flange 122 as well as a ring flange 124, instead of the flanges 94 and 114 of FIG. 6, respectively. These flanges 122 and 124 are welded directly to the ends of the housing means 120. The flange 122 has a seal-weld connection to the sleeve 126 which may be identical with the sleeve 96 and which has also a threaded connection with a ring 128 which may be identical with the ring 98. The flange 124 serves to connect to the housing 120 the bonnet 128 which is welded to the flange 130 which in turn can be connected by suitable bolts to the flange 124 without requiring any gaskets between these flanges, which is also true of the other flanges at the connections between the above-described bonnets and housings. It will be seen that the embodiment of FIG. 7 also has a gate disc 132 which may be identical with the disc 104 and which cooperates in the same way through edges with a rod 134 which corresponds to and may be identical with the rod 110.

Of course it is to be understood that the unillustrated halves of the embodiments of FIGS. 6 and 7 are mirror images of those halves which are illustrated. Thus with the embodiment of FIG. 7 there is also a stop or pedestal 136 against which the disc 132 becomes located before being urged by the moving means against the Stellite 6 metallic coating seat at the inner end of the sleeve 126, the disc 132 of course having a ring of Stellite 6 metallic deposit for engaging the seat at the inner end of the sleeve 126.

It is thus apparent that with all of the above-described embodiments of the invention there are in common the features of providing for the gate means a movement, during closing of the valve, first into a position of alignment with the sleeves and then along the common axis of the sleeves into engagement with the seats at the inner ends thereof, with the added feature that the gates can readily adjust themselves because of the ball-mounting thereof, in order to compensate for any inaccuracies which may be present. Furthermore, the sleeves serve to protect the housing from direct exposure to wide temperature fluctuations so that the life of the valve is increased, with the sleeves as well as the gate discs being capable of easy replacement whenever required.

Furthermore, while all of the above-described embodiments relate to complete valves which do not have any cast components which are likely to crack, it is also possible to utilize the invention in connection with existing valves which have cast metal housings. Thus such valves can easily be adapted to receive the sleeves and gate means of the invention, so that by such a modification of existing valves it is also possible to protect the existing cast metal housings thereof to reduce the possibility of cracking thereof.

The several valve housings referred to above may be made of steel and may be welded from a standard formed "Tee". Standard steel flanges are utilized for the valve ends and bonnet joints. There is no requirement of an intricate internal shape of a conventional cast valve in order to facilitate installation of seat rings and body/disc guides, and there is also no requirement of specialized machine tooling.

It is to be noted particularly that in case of FIGS. 6 and 7 the internally threaded rings 98 and 128 reinforce and strengthen the housing.

Thus, the valves of the invention, made of a welded steel construction and fabricated, for example, from rolled steel plate and forged steel components, will eliminate the cracking problem inasmuch as these construction materials of the invention do not contain the defects of cast steel which make cast steel susceptible to cracking.

The thermal shielding of the housing by way of the sleeves makes the valve of the invention a better suited steel gate valve for cyclic temperature application inasmuch as the seat sleeves protect the housing body from direct exposure to temperature changes.

Moreover, various types of valve seats can be utilized. Thus, the valve seats, which may be considered as gasket surfaces, when damaged, can easily be replaced, and can readily be changed from raised face to ring joint, to tongue-and-groove constructions, simply by changing the seats, or in other words by changing the sleeves which carry the seats which have a desired construction.

Moreover, it is possible to utilize with the valve of the invention conventional bonnets, which can be also reused, if desired. A pressure seal or special welded bonnet joint is preferred.

It is to be noted that the thermal shielding achieved by way of the sleeves of the invention, either for valves of the type described above or for existing cast steel housing bodies, serves to reduce the thermal gradient acting on the valve particularly when flow is started, inasmuch as it is at this time that rapid heat-up occurs.

It is to be noted that in all of the embodiments of the invention there are no angularly disposed corner welds or the like which are difficult to test in order to determine that they are properly constructed. Instead in all of the embodiments of the invention there are only common girth or butt welds which can indeed be easily tested to check for the proper construction thereof. This type construction lends itself to automatic welding which is superior and of lower cost.

What is claimed is:

1. A gate valve comprising housing means having a hollow interior and opposed coaxial tubular ends each with an integral end flange, cylindrical tubular means removably carried by said housing means extending between said ends and fixedly secured to said end flanges and with said housing means during operation of said valve and having a central axis along which fluid is adapted to flow, said tubular means terminating internally of said housing means opposite from said end flanges in spaced seat means integral at the inner end of each said tubular means and removable with said tubular means through a selected one of said tubular ends, said seat means disposed normal to said axis to form a parallel gap therebetween, gate means situated internally of said housing means and having a closed position engaging said seat means only in a plane normal to said axis for providing a fluid-tight seal and preventing flow of fluid through said tubular means and an open position situated beyond the axis of said tubular means for enabling flow of fluid therethrough, said tubular means being in removable threaded engagement with said housing means for a short axial distance at said end flange for a distance substantially less than the axial length of the tubular means and of the adjacent housing, the non-treaded portion of said tubular means having an outside diameter substantially less than the inside diameter of said housing means to provide an annular clearance therebetween to thereby thermally shield said housing from temperature influences produced by the fluid which flows through said tubular means, moving means operatively connected for moving said gate means between said open and closed positions thereof, said moving means when moving said gate means from said open to said closed position first moving said gate means transversely with respect to said axis to a position of alignment with said seat means while still being spaced therefrom, and stop means situated in said housing means in the path of movement of said gate means from said open toward said closed position thereof for stopping the movement of said gate means by said moving means transversely with respect to said axis when said gate means reaches said position of alignment with said seat means, said moving means after displacing said gate means to said position of alignment determined by said stop means then cooperating with said gate means for displacing the latter only in an axial direction into said fluid seal engagement with said seat means to assume said closed position, said stop means guiding said gate means during seating movement thereof into engagement with said seat means by the continued operation of said moving means.

2. The valve of claim 1 wherein said housing means is of a hollow substantially T-shaped configuration and has a pair of opposed coaxial tubular end regions, said tubular means extending through said tubular end regions of said housing means while being fixed thereto for reducing exposure of said housing means to temperature fluctuations of the fluid which flows through said tubular means.

3. The valve of claim 1 wherein said tubular means carry at their inner ends circular metallic coatings which form said seat means, said gate means carrying circular metallic coatings which engage said coatings carried by said tubular means when said gate valve is closed.

* * * * *